United States Patent [19]

Blahous

[11] Patent Number: 4,724,391
[45] Date of Patent: Feb. 9, 1988

[54] METHOD FOR DETERMINING THE TIME OF RECLOSING A CIRCUIT BREAKER AND DEVICE FOR CARRYING OUT THIS METHOD

[75] Inventor: Leopold Blahous, Wettingen, Switzerland

[73] Assignee: BBC Brown, Boveri & Company Ltd., Switzerland

[21] Appl. No.: 696,264

[22] Filed: Jan. 30, 1985

[30] Foreign Application Priority Data

Feb. 14, 1984 [CH] Switzerland ............... 699/84

[51] Int. Cl.$^4$ ............................................. G01R 31/02
[52] U.S. Cl. ............................. 324/424; 324/423; 361/71; 364/569
[58] Field of Search ............ 324/424, 423, 418; 361/71, 73, 89; 364/569, 492, 483

[56] References Cited

U.S. PATENT DOCUMENTS

| | | | |
|---|---|---|---|
| 4,039,932 | 8/1977 | Duckworth | 324/423 |
| 4,454,476 | 6/1984 | Kobayashi et al. | 324/424 |
| 4,454,556 | 6/1984 | De Puy | 361/71 |
| 4,481,473 | 11/1984 | Compton | 324/423 |
| 4,538,197 | 8/1985 | Breen | 361/71 |

Primary Examiner—Reinhard J. Eisenzopf
Assistant Examiner—Robert W. Mueller
Attorney, Agent, or Firm—Ostrolenk, Faber, Gerb & Soffen

[57] ABSTRACT

A method for reclosing a temporarily opened circuit breaker in a manner which assures that generation of unwanted overvoltage stresses is avoided during the reclosure process. An oscillating line voltage typically develops in a shunt-compensated line after a circuit breaker connecting the line to a voltage source is opened. When the circuit breaker is reclosed the source voltage and the oscillating voltages must be properly phased to avoid the overstressing problem. In operation, the polarities of the feed voltage and the oscillating line voltage are detected and the instant when the circuit breaker may be reclosed is calculated. The periods $T_L$ and $T_S$ of the line voltage and the feed voltage are measured. Also measured is the time $\Delta T$ which elapses from a zero crossing of the line voltage waveform to a subsequent zero crossing of the feed voltage waveform having the same phase angle as that of the line voltage zero crossing. The circuit breaker is reclosed upon satisfying the relationship:

$$|nT_L - (\Delta T + mT_S)| \leq (T_L - T_S)/2$$

where m, n are natural numbers which are sequentially entered in the above equation.

13 Claims, 5 Drawing Figures

METHOD FOR DETERMINING THE TIME OF RECLOSING A CIRCUIT BREAKER AND DEVICE FOR CARRYING OUT THIS METHOD

BACKGROUND AND SUMMARY OF THE INVENTION

The invention is directed to a method for determining the time of reclosing a circuit breaker.

The invention relates to a prior art as described in the report "Measures taken to reduce overvoltages when energizing no-load lines" by G. Köppl in Surges in High Voltage Networks, edited by K. Ragaller, Plenum Press New York 1980.

In electric systems which feed voltages of greater than or equal to 362 kV, the necessary insulation is determined by the circuit voltage loading. A critical situation arises during rapid reclosing of circuit breakers which were interrupted in response to earth shorts on a line. The problem is due to certain voltages which may develop on the line due to the prior interruption which voltage may interact adversely with the line voltage during reclosing of the circuit breaker. With a three-phase interruption due to a single-phase short, that is to say when all three poles of the circuit breaker are open, the last-quenching two poles of the unaffected phase interrupt an open line.

For the case of uncompensated lines containing capacitive voltage transformers, a load which changes only very slowly is left on the line. Therefore, during the rapid reclosing, switching does not take place when feed voltage and load are of opposite polarity. Thus, the polarities of the feed voltage and of the load remaining on the disconnected line are detected in the known method and reclosing takes place when the polarities are identical.

In shunt-compensated lines the precharged line capacity and the inductances of compensating chokes form a tuned circuit. Consequently, the voltage on the line side oscillates with a natural frequency which is determined by the degree of compensation and which is lower than the frequency of the feed voltage. It is therefore possible to close the circuit breaker when supply and line voltage have opposite polarities. In such case, unacceptably high switching overvoltages occur at the open end of the line.

SUMMARY OF THE INVENTION

It is an object of the present invention to provide a generic method and an apparatus for carrying out the method which make it possible to reclose the breakers in the presence of alternating voltages on the supply side and on the line side without creating unacceptably high switching overvoltages.

The method according to the invention and the device provided therefore make it possible to limit closing overvoltages to values which dispense with the need to use switching resistors even in lines having a relatively low degree of compensation and/or long lines. At the circuit breaker, therefore, additional switching paths for the switching resistors can also be omitted as can the necessary coordination of insulation between the open power switching path and the switching path, arranged in parallel to this, for the switching resistors in the case of the action of lightning or switching voltage loading. Also avoided is the need for costly and complicated mechanisms for controlling the sequence of movements, which must be accurately staggered in time, of the contacts of the power and of the resistor switching paths. The use of relatively expensive and sensitive ceramic material for the switching resistors is rendered unnecessary.

BRIEF DESCRIPTION OF THE DRAWINGS

An illustrative embodiment of the invention is described below by reference to the drawings, in which.

DETAILED DESCRIPTION OF THE PREFERRED EMBODIMENTS

Figure 1:
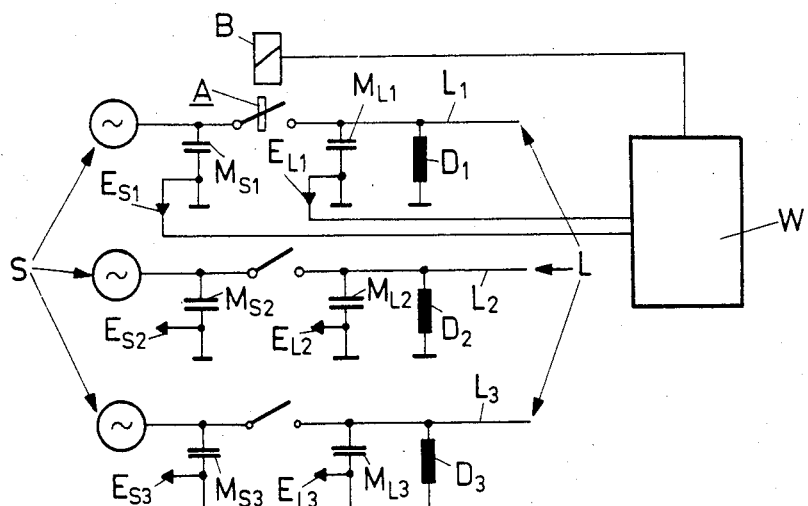
FIG. 1 shows a basic circuit diagram of a three-phase line which is interrupted by a circuit breaker and which is provided with shunt compensation, comprising a reclosing device according to the invention which controls one pole of the circuit breaker.

In FIG. 1, $L_1$, $L_2$ and $L_3$ are three phase conductors of a line L which is switched off at both ends and which is shunt-compensated, for example via chokes $D_1$, $D_2$ and $D_3$. These chokes can also be constructed as a three-phase unit. The left-hand end of the line L can be connected via a three-pole circuit breaker A to a three-phase voltage source S. Instrument transformers $M_{S1}$, $M_{S2}$, and $M_{S3}$ and $M_{L1}$, $M_{L2}$ and $M_{L3}$, which, for example, act capacitively, supply signals $E_{S1}$, $E_{S2}$ and $E_{S3}$, which are proportional to the feed or source voltages delivered by the phases of the voltage source S, and signals $E_{L1}$, $E_{L2}$ and $E_{L3}$ which are proportional to the line voltages acting on the phase conductors $L_1$, $L_2$ and $L_3$. The signals $E_{S1}$ and $E_{L1}$, delivered by the instrument transformers $M_{S1}$ and $M_{L1}$, are fed to a reclosing device W the output of which is applied to an exciter element B of a pole 1 of the circuit breaker A. The exciter element B is activated by the delivery of a reclosing command, generated by the device W. It then recloses the pole 1 of the circuit breaker A at an appropriate time. The poles 2 and 3 of the circuit breaker A are controlled identical reclosing devices, not shown.

After circuit breaker A is opened, the voltages on the line L oscillate at a dominant frequency which is lower than the frequency of the feed voltage of source S. This is due to the fact that the capacitance, which is precharged by the feed source S, of the line L and the chokes $D_1$, $D_2$ and $D_3$ form a tuned circuit which, upon opening of circuit breaker A, oscillates at a natural frequency determined by the chokes $D_1$, $D_2$ and $D_3$. To prevent circuit breaker A from reclosing when feed and line voltages have opposite polarities, method steps are specified, in accordance with the invention, which reliability permit the reclosing process to take place when feed and line voltages have identical polarities. The general concept of the present invention is explained with the aid of FIGS. 2 and 3.

Figure 2:
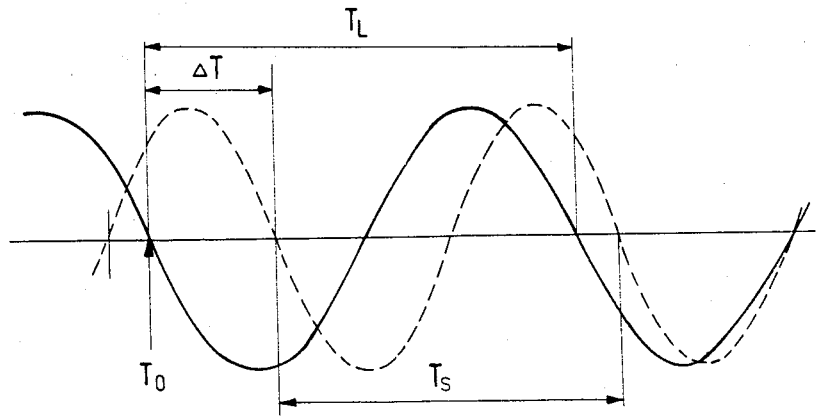
FIG. 2 is a graphic representation of the line voltage acting in one phase conductor of the line according to FIG. 1 and a feed voltage, which can be switched onto the line via the circuit breaker.
Figure 3:
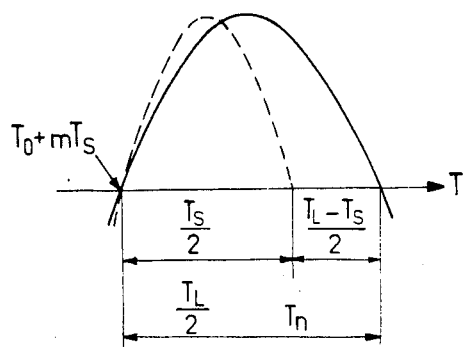
FIG. 3 is a graphic representation of line and feed voltage similar to FIG. 2, from which the condition can be seen at which line and feed voltage have the same polarity.

To provide controlled reclosing, it is first necessary to measure the line and feed voltages continuously at each phase. FIG. 2 shows line voltage (shown by a solid line) and the higher-frequency feed voltage (dashed line) of one phase. $T_0$ is the reference point from which the time for reclosing is determined. The point $T_0$ is determined by a zero transition of the line voltage. $T_L$ and $T_S$ are the periods, previously determined through measuring zero transitions, of the line and feed voltages. $\Delta T$ represents the time which elapses from the first zero transition of the line voltage at time $T_0$ to the zero transition of the feed voltage from which the feed voltage has the same polarity as the line voltage in the half period following $T_0$.

For all times $T_n - T_0 = \Delta T + m\,T_S$, the feed voltage has a half wave of identical polarity to the line voltage, to which applies the following reclosing condition:

$$|nT_L - (\Delta T + mT_S)| \leq \frac{(T_L - T_S)}{2},$$

where n, m=1, 2, 3, ....

The reason for this is as follows:

Since at time $T_0$, the line voltage begins to oscillate with the same polarity as the feed voltage at time $T_0 + \Delta T$, both will oscillate with the same polarity after $nT_L$ or $mT_S$. For this reason, they have the same polarity in the half period immediately before the zero transition at time $T_0 + nT_L$ or $T_0 + mT_S + \Delta T$ if $nT_L \geq mT_S + \Delta T$. This can be seen from FIG. 3. If $nT_L \leq \Delta T + mT_S$ and the reclosing condition is met, the feed and the line voltage have identical polarity in the feed voltage half period following time $T_0 + \Delta T + mT_S$. The aforementioned condition then ensures that the higher-frequency half wave of the feed voltage is wholly contained in a lower-frequency half wave of the same polarity of the line voltage so that reclosing is guaranteed to occur when line and feed voltage are of identical polarity.

However, a circuit breaker has a natural mechanical period whose exact value is statistically varied. $T_{mech}$ designates the mean of the natural mechanical period of one switch pole. For a mechanical circuit breaker, the aforementioned reclosing condition must be completed by meeting the condition:

$$(\Delta T + mT_S) > T_{mech} + \frac{T_S}{4}$$

which assumes that the natural period $T_{el}$ of an electronic reclosing circuit used in this arrangement is negligible compared with the natural mechanical periods of the switch and the durations of the periods $T_L$ and $T_S$.

For each pair m, n, for which the two above conditions are met, the time at which the ON command is given to the circuit breaker, is then determined from $$t_E = T_0 + (\Delta T + mT_S) - \left(T_{mech} + \frac{T_S}{4}\right),$$

for $nT_L \geq \Delta T + mT_S$ $$t_E = T_0 + (\Delta T + mT_S) - T_{mech} + \frac{T_S}{4}, \text{ for } nT_L \leq \Delta T + mT_S.$$

Taking into consideration the natural period $T_{el}$ of the reclosing device, this time is then determined from $$t'_E = T_0 + (\Delta T + mT_S) - \left(T_{mech} + \frac{T_S}{4}\right) - T_{el},$$

for $nT_L \geq \Delta T + mT_S$ $$t'_E = T_0 + (\Delta T + mT_S) - T_{mech} + \frac{T_S}{4} - T_{el},$$

for $nT_L \leq \Delta T + mT_S$.

If an ON command is given at time $t_E$, the mean of the closing time occurs at the maximum of the feed voltage. Since the line voltage then has the same polarity, the potential difference across the switch is very small during the closing process (see FIG. 3).

The reclosing control method in accordance with the invention can be carried out, for example, by means of a microcomputer with a programmed search loop. In this case, the index m is incremented by 1 with each run through the loop and the reclosing condition is interrogated with each run. If $(mT_S + \Delta T) \geq nT_L$ without the reclosing condition being met, n is incremented by 1 and the program again runs through the m loop until the reclosing condition is met.

The condition, which takes into consideration the natural mechanical period of the circuit breaker, can already be met by the initial condition. Instead of beginning with n=1, $n = n_{min}$ is used, $n_{min}$ being the smallest integer for which $$n_{min}T_L > T_{mech} + \frac{T_S}{4}.$$

However, the reclosing condition can also be realized by two counters. One counter continues to count by $T_S$ and if $$mT_S > nT_L$$

the second counter continues to count by $T_L$. The counter status can be continuously interrogated to find the reclosing condition. In order to accelerate the search process, $T_S$ and $T_L$ can be reduced by a constant common factor. This makes it possible to continue to count the periods more rapidly.

Figure 4:
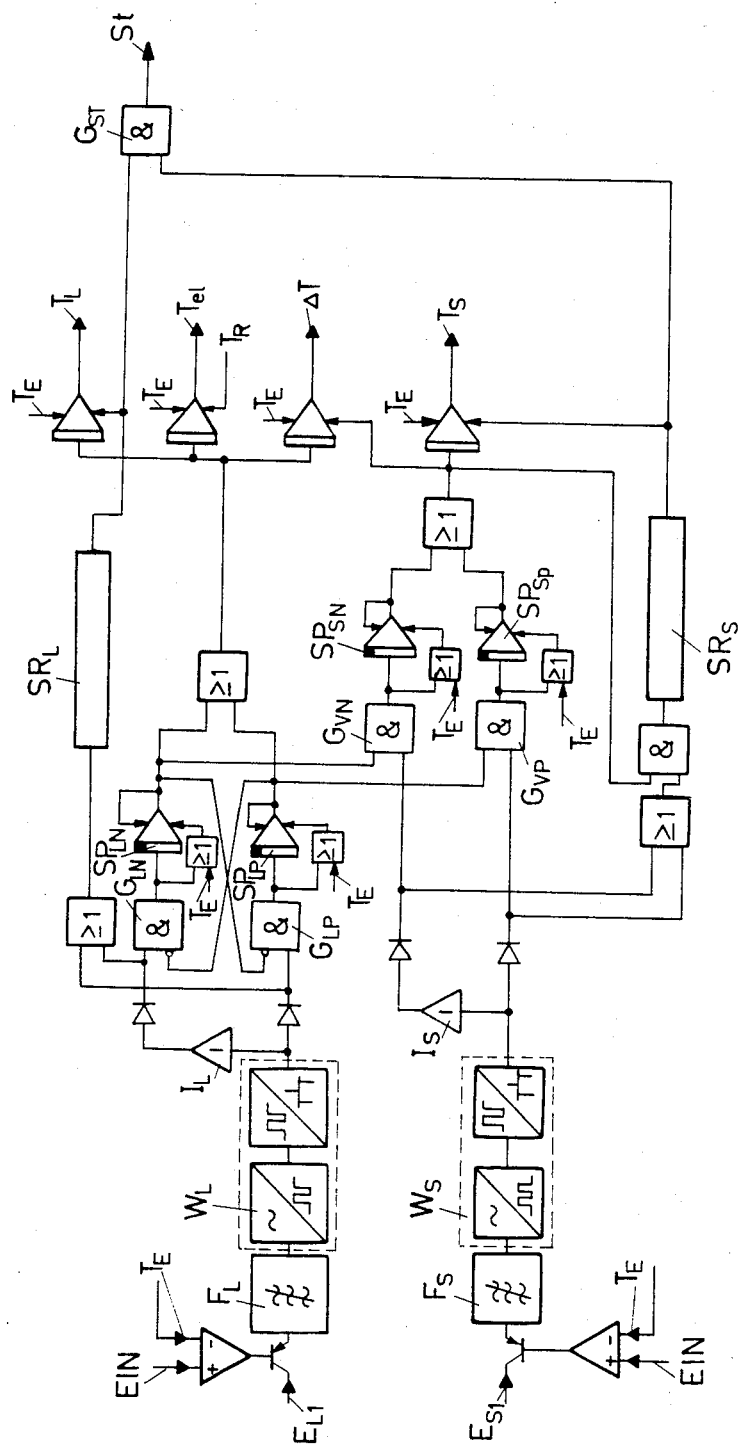
FIG. 4 shows an embodiment of a measuring circuit used in the reclosing device according to the invention.
Figure 5:
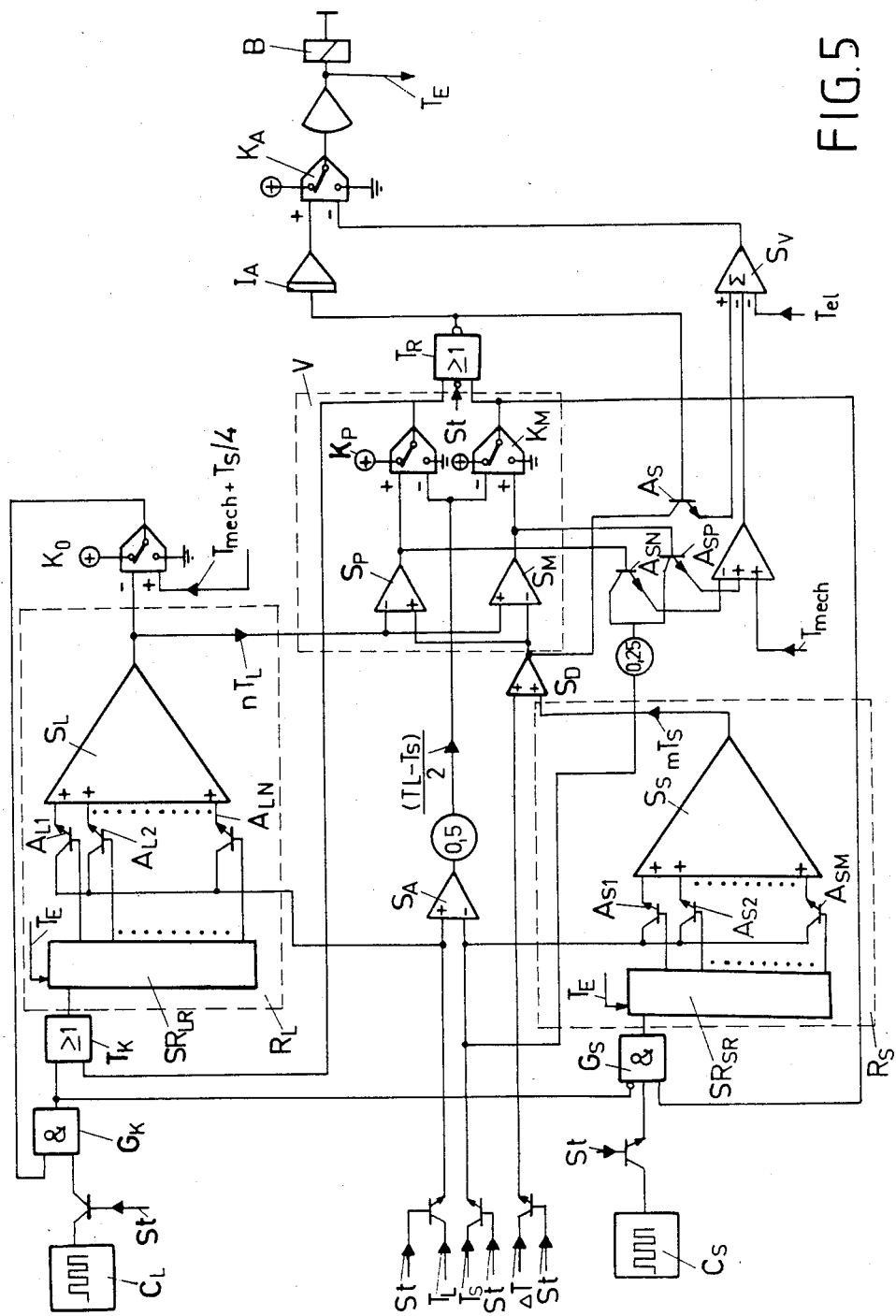
FIG. 5 shows an embodiment of an arithmetic unit, which follows the measuring circuit of FIG. 4, of the reclosing device according to the invention.

FIGS. 4 and 5 show in detailed form the circuit arrangement for carrying out the method according to the invention. In this arrangement, in FIG. 4 a measuring circuit is shown which determines the durations of the periods $T_L$ and $T_S$ of line voltage and feed voltage and the time $\Delta T$ and in FIG. 5 an arithmetic unit is shown which follows the measuring circuit and uses analogue techniques and which determines the reclosing time $t_E$ from the quantities determined in the measuring circuit, taking into consideration the reclosing condition and the natural periods $T_{mech}$ and $T_{el}$.

In the measuring circuit shown in FIG. 4, $F_L$ and $F_S$ are designations for low-pass filters which in each case precede a signal converter $W_L$ and $W_S$. The output of the signal converter $W_L$ is connected, on the one hand, via an inverter $I_L$ and a diode, which follows this inverter, to one of two inputs of an AND gate $G_{LN}$ the output of which acts on a controllable member $SP_{LN}$ and to one of two inputs of an OR gate, which precedes a shift register $SR_L$. On the other hand, the output of the signal converter $W_L$ is connected via another diode to one of two inputs of another AND gate $G_{LP}$, the output of which acts on a controllable memory $SP_{LP}$ and to the second input of the OR gate preceding the shift register $SR_L$.

The output of the signal converter $W_S$ is connected, on the one hand, via an inverter $I_S$ and a diode, which follows this inverter, to one of two inputs of an AND gate $G_{VN}$, the output of which acts on a controllable memory $SP_{SN}$ and to one of two inputs of an OR gate which precedes a shift register $SR_S$. On the other hand, the output of the signal converter $W_S$ is connected via another diode to one of two inputs of an AND gate $G_{VP}$, the output of which acts on a controllable memory $SP_{SP}$ and to the other input of the OR gate preceding the shift register $SR_S$. Between the OR gate preceding the shift register $SR_S$, an AND gate is located, one input of which is operatively connected to the output of an OR gate which follows the controllable memories $SP_{SN}$ and $SP_{SP}$ and the output of which is also connected to the input of a controllable integrator for the duration of the period $T_S$. The outputs of the controllable memories $SP_{LN}$ and $SP_{LP}$ are respectively connected to one of two inputs of an OR gate, the output of which acts on the inputs of controllable integrators for the duration of the period $T_L$, the natural electronic period $T_{el}$ and the time $\Delta T$. In addition, the output $SP_{LN}$ is also connected to an inverting input of the AND gate $G_{LP}$ and to one input of the AND gate $G_{VN}$. The output of $SP_{LP}$ is also connected to an inverting input of the AND gate $G_{LN}$ and to one input of the AND gate $G_{VP}$. The outputs of the shift registers $SR_L$ and $SR_S$ act on an AND gate $G_{St}$, which generates and activates the start command St needed for the arithmetic unit, and the controllable integrators for $T_L$ and $T_S$.

The measuring section is activated only when a closing command ON, which turns on switching transistors, not designated, is issued by the reclosing device. This enables voltages $E_{L1}$ and $E_{S1}$ supplied from the instrument transformers $M_{L1}$ and $M_{S1}$ to be input to the measuring circuit. These voltages are processed in converters $W_L$ and $W_S$ to produce "needle pulses" i.e. a sharp and narrow pulse at each zero transitions of the respective voltages. Inverters $I_L$ and $I_S$ function to invert the negative needle pulses. The diodes function to allow only pulses belonging to the negative sign of the oscillation to pass through the channel for negative sign and only those pulses belonging to the positive sign of the oscillation to pass through the channel for positive sign. If a negative line voltage pulse passes through, both inputs of the AND gate $G_{LN}$ are enabled and the output of $G_{LN}$ is the input of the controllable memory $SP_{LN}$ and, simultaneously, the control input for the "follow" state of operation. Thus the output of the memory $SP_{LN}$ is also enabled and drives $SP_{LN}$ to the "hold" state, that is to remain enabled. The inverting input of $G_{LP}$ is thus at zero and, therefore, holds the output of the memory $SP_{LP}$ at zero for the remainder of the measurement. Thus one input of $G_{VP}$ also remains at zero so that $G_{VP}$ is disabled. Now an integrator for measuring $T_S$ can be enabled via the negative channel of the feed voltage. This can take place only after the first zero transition of the line voltage because prior to that one input of $G_{VN}$ is at zero. The first zero transition of the line voltage starts the integrators for $T_L$, $\Delta T$ and $T_{el}$.

The shift register $SR_L$ is clocked with the pulses of the line voltage. When the first value has been shifted by 3 places in the shift register, 3 voltage zero transitions have been counted and the output of the third position in the shift register is enabled. At that time the integrator for $T_L$ is put in its "hold" state and at its output representing the value $T_L$ is available.

As soon as a negative pulse is available also from the feed voltage, the output of $G_{VN}$ is enabled and thus also the output of the controllable memory $SP_{SN}$. This starts the integrator for $T_S$ and simultaneously the integrator for $\Delta T$ is driven to the "hold" state and at its output $\Delta T$ becomes available. Similarly, the path to the shift register $SR_S$ is opened. As soon as the contents of shift register $SR_S$ have also been shifted by three places, the integrator for $T_S$ is driven to the "hold" state and $T_S$ becomes available at its output.

Once the measurement of the duration of the periods both of the line and of the feed oscillation is completed, both inputs of the AND gate $G_{St}$ are enabled and the St command for starting the arithmetic unit (FIG. 5) is output.

The arithmetic unit has two pulse generators $C_L$ and $C_S$, the outputs of which are applied via switching transistors to the first of two inputs of AND gates $G_K$ and $G_S$, respectively.

The output of $G_K$ acts on a first input of an OR gate $T_K$ preceding an adding unit $R_L$. The adding unit $R_L$ contains a shift register $SR_{LR}$ having a storage function and a summing unit $S_L$ having a number of inputs which corresponds to the number of outputs of the shift register $SR_{LR}$. In each case, the outputs of the shift register drive a switching transistor $A_{L1}, A_{L2}, \ldots A_{LN}$, which is connected between an input of the summing unit $S_L$ and a branch point to which the signal of the duration of the period $T_L$ is applied. In this arrangement, the outputs of the shift register $SR_{LR}$ are associated with the inputs of the summing unit $S_L$ in such a manner that the inputs of the summing unit $S_L$ are successively activated when the shift register $SR_{LR}$ is enabled. The output of the summing unit $S_L$ is supplied to a first input of a comparing element V and, also to a first input of a comparator $K_0$. A second input of the comparator $K_0$ continuously receives a signal $T_{mech} + T_S/4$, which takes into consideration the natural mechanical period of the circuit breaker A. The output of the comparator is connected to the second input of $G_K$.

The output of $G_S$ is supplied to a register $R_S$. Register $R_S$ contains a shift register $SR_{SR}$ used as a storage and a summing unit $S_S$ having a number of inputs which corresponds to the number of outputs of shift register $SR_{SR}$. The outputs of the shift register $SR_{SR}$ in each case drive one switching transistor $A_{S1}, A_{S2}, \ldots A_{SM}$ which is located between one input of the summing unit $S_S$ and a branching point to which the signal $T_S$ is applied. Corresponding to the outputs of the shift register $SR_{LR}$, the outputs of the shift register $SR_{SR}$ are associated with the inputs of the summing unit $S_S$. The output of the summing unit $S_S$ is supplied to a first input of a summing unit $S_D$ which precedes the comparing element V. The second input of summing unit $S_D$ receives the signal $\Delta T$. The output of the summing unit acts, on the one hand, via a switching thyristor $A_S$, on a first input of a summing unit $S_V$ and, on the other hand, on a second input of the comparing element V.

Comparing element V has a third input to which a signal $(T_L - T_S)/2$ is applied. The foregoing quotient is formed by a summing unit $S_A$ and a following coefficient potentiometer. A first output of the comparing element V is output to a first input of an OR element $T_R$ and to the second input of $T_K$. A second output acts on a second input of $T_R$ and on the second input of $G_S$. A switch $A_{SP}$ receives a third output and a fourth output of element V acts on switch $A_{SN}$. The output of $T_R$ is supplied to the switch $A_S$ and to an integrator $I_4$, the output of which integrator is connected to a first of the two inputs of a comparator $K_4$. The output of comparator $K_4$ is applied via an amplifier to the exciter element B of the circuit breaker.

The comparing element V is provided with two summing units $S_P$ and $S_M$. First inputs of said summing units are connected to the output of the adding unit $R_L$, the signal coming from the adding unit $R_L$ being made negative at the first input of the summing unit $S_P$. Second inputs of the summing units $S_P$ and $S_M$ are connected to the output of the summing unit $S_D$. In this arrangement, the signal accepted from the second input of the summing unit $S_M$ is made negative. The outputs of the summing units $S_P$ and $S_M$ act on first inputs of two comparators $K_P$ and $K_M$, at the second inputs of which the signal $(T_L - T_S)/2$ is input and the outputs of which act on the inputs of $T_R$.

Immediately upon generation of starting signal St by the measuring circuit of FIG. 4, the switching transistors located between the pulse generators $C_L$ and $C_S$ and the AND gates $G_L$ and $G_K$, and other transistors preceding the summing units $S_A$ and $S_D$ are turned on in the arithmetic unit of FIG. 5. THe signal $T_L$ is now present at the switching transistors $A_{L1}, \ldots, A_{LN}$ of the summing unit $S_L$ and the signal $T_S$ is presented at the switching transistors $A_{S1}, \ldots, A_{SM}$ of summing unit $S_S$. As long as none of these transistors has been turned on, the output of the summing unit $S_L$ is zero and the output of the comparator $K_O$ remains enabled. With each pulse received from pulse generator $G_L$, $G_K$ will therefore remain enabled for as long as the signal at the output of $S_L$ is less than $T_{mech} + (T_S/4)$, that is the shift register $SR_{LR}$ is clocked such that each clock pulse turns on the respective next one of the switching transistors $A_{Li}$, where $i = 1, \ldots N$. Thus the signal $T_L$ is applied to a new input of the summing unit $S_L$. As soon as the output of the summing unit $S_L$ is greater than $T_{mech} + (T_S/4)$, the output of the comparator $K_0$ becomes to zero to disable $G_K$. The shift register $SR_{LR}$ can no longer be then clocked by the pulse generator. The signal at the output of the summing unit $S_L$ is $n_{min}T_L > T_{mech} + (T_S/4)$. The inverting input of $G_S$ is enabled, so that $G_S$ is no longer disabled. At the output of the summing unit $S_M$, the signal $(n_{min} \cdot T_L - \Delta T)$ is present which is greater than the signal $(T_L - T_S)/2$. The output of the comparator $K_M$ is therefore enabled and the output of the comparator $K_P$ is disabled. The inverting OR gate $T_R$ is disabled.

If $K_M$ is enabled, $G_S$ is able to pass every pulse from the pulse generator $I_S$. The signal $T_S$ is in each case applied to a new input of the summing unit $S_L$ via the shift register $SR_{SR}$ which is clocked by these pulses. At the output of $S_S$ the signal $mT_S$ now appears. If $mT_S + \Delta T > nT_L$, the output of the summing unit $S_M$ becomes negative and the output of $K_M$ goes to zero and disables $G_S$. If, in addition, $(mT_S + \Delta T) - nT_L > (T_L - T_S)/2$, $K_P$ is enabled. This causes the shift register $SR_{LR}$ associated with the summing unit $S_L$ to be clocked and $nT_L$ to be incremented by $T_L$. At the output of $S_L$, $(n+1)T_L$ appears. This causes the output of $S_M$ to become positive again. $K_M$ is enabled again and clocking of the shift register $SR_{SR}$ for the summing unit $S_S$ can be continued. if $/-(mT_S + \Delta T) + nT_L/ \leq (T_L - T_S)/2$, both comparators $K_P$ and $K_M$ are at zero and $T_R$ is enabled. Further clocking of the shift registers $SR_{LR}$, $SR_{SR}$ is no longer Possible. The switching transistor $A_S$ driven by $T_R$ switches the value $mT_S + \Delta T$ at the output of the summing unit $S_D$ to the summing unit $S_V$.

$T_R$ drives an integrator for $T_{el}$ to the "hold" state and starts the integrator $I_4$. At the output of the summing unit $S_V$ the closing time $t'_E = (mT_S + \Delta T) - (T_{mech} + (T_S/4)) - T_{el}$ or $t'_E = (mT_S + \Delta T) - T_{mech} + (T_S/4) - T_{el}$. As soon as this time has elapsed (integrator $I_4$ has reached this value), the comparator $K_4$ is enabled and the exciter element B of the circuit breaker A is activated via an amplifier. All elements and memories are reset with the command $T_E$ occurring when the closing command is outpt to the exciter element B and the device is ready for the next rapid reclosing operation.

I claim:

1. Method for determining the time for reclosing a circuit breaker located between a periodically varying source voltage and an electrical line, wherein the line sustains a periodically varying line voltage developing thereon in consequence of a prior opening of said circuit breaker, comprising the steps of:

determining the respective periods $T_L$ and $T_S$ of the line voltage and the source voltage;

measuring a time interval $\Delta T$ representing the elapsed time from a zero crossing of the line voltage to a next following zero crossing of the source voltage wherein the respective zero crossings of the line and source voltages have the same phase angle;

monitoring an occurrence of a predetermined reclosing condition by ascertaining that the relationship $$|nT_L - (\Delta T + mT_S)| \leq (T_L - T_S)/2$$

has been met, wherein m and n are natural, ascending integer numbers, satisfaction of the relationship being effective to yield a time interval during which the source and line voltages have like polarities; and selecting a predetermined time instant during the time interval at which the circuit breaker shall be reclosed.

2. Method according to claim 1, wherein the line is a shunt-compensated line and wherein $T_L$ exceeds $T_S$ and wherein the method further comprises:

awaiting determination of the values of $T_S$, $T_L$, and $\Delta T$;

thereafter, setting the variable m to 1 and continuously incrementing m by one;

after each incrementation of m, testing the relationship to determine whether the reclosing condition has been met and also determining whether the relationship $$(mT_S + \Delta T) > nT_L$$

has been satisfied if the reclosing condition has not been satisfied; and incrementing n by one and rechecking the reclosing condition as above for each incrementation of the number n.

3. Method according to claim 2, wherein checking of the reclosing condition is undertaken only for values n which are not smaller than a value $n_{min}$ for which the condition $$n_{min}T_L > T_{mech} + \frac{T_S}{4}$$

is satisfied, wherein $T_{mech}$ represents a natural mechanical reaction period of the circuit breaker.

4. Method according to claim 2, wherein checking of the reclosing condition is undertaken only for values n which are not smaller than a value $n_{min}$ for which the condition $$n_{min}T_L > T_{mech} + \frac{T_S}{4} + T_{el}$$

is satisfied, wherein $T_{mech}$ is a natural mechanical reaction period of the circuit breaker and $T_{el}$ is the natural electrical reaction period of a reclosing device which is employed to activate the circuit breaker.

5. Method according to claim 1, wherein the line is a shunt-compensated line and wherein $T_L$ exceeds $T_S$ and wherein the method further comprises:
   awaiting determination of the values of $T_S$, $T_L$, and $\Delta T$;
   thereafter, setting the variable m to 1 and continuously incrementing m by one;
   after each incrementation of m, testing the relationship to determine whether the reclosing condition has been met and also determining whether the relationship $$mT_S > nT_L$$

has been satisfied if the reclosing condition has not been satisfied; and
   incrementing n by one and rechecking the reclosing condition as above for each incrementation of the number n.

6. Method according to claim 5, further comprising the step of scaling the values $T_L$ and $T_S$ respectively associated with the line and source voltages by a constant factor which is common to both $T_L$ and $T_S$.

7. A reclosing apparatus for determining the time for reclosing a circuit breaker located between a periodically varying source voltage and an electrical line, wherein the line sustains a periodically varying line voltage developing thereon in consequence of the prior opening of said circuit breaker, the apparatus comprising:
   a measuring circuit for measuring the respective periods $T_L$ and $T_S$ of the line voltage and the source voltage and for measuring a time interval $\Delta T$ representing the elapsed time from a zero crossing of the line voltage to a next following zero crossing of the source voltage, wherein the respective zero crossings of the line and source voltages have the same phase angle;
   an arithmetic unit coupled to the measuring circuit for monitoring the occurrence of a predetermined reclosing condition by ascertaining that the relationship $$|nT_L - (\Delta T + mT_S)| \leq (T_L - T_S)/2$$

has been met, wherein m and n are natural, ascending integer numbers, satisfaction of the relationship being effective to yield a time interval during which the source and line voltages have like polarities; and
   means for selecting a predetermined time during the time interval during which the predetermined reclosing conditions has been met during which to reclose the circuit breaker.

8. A reclosing apparatus according to claim 7, wherein the arithmetic unit comprises:
   a clocked first adding unit for developing a signal representative of the value $nT_L$;
   a clocked second adding unit for forming a signal representative of the value $mT_S$;
   a summing and multiplying unit which is effective for providing a signal representative of the value $(T_L - T_S)/2$; and
   a comparing element for receiving the $nT_L$, $mT_S$, and $(T_L - T_S)/2$ signals and for carrying out the function of checking the occurrence of the reclosing condition.

9. A reclosing apparatus according to claim 8, wherein at least one of said adding units comprises a clocked shift register and a summer unit, means located between said clock shift register and said summer unit for coupling outputs of said clock shift register to inputs of said summer unit, said means being effective to assure that a respective input signal applied to said clock shift register is sequentially propagated through outputs of said shift register in such a manner that each clock pulse applies to said shift register causes aid input signal to be connected to a next following input of said summer unit.

10. A reclosing apparatus according to claim 8, wherein said comparing element comprises:
    a first summing unit;
    a second summing unit;
    said $nT_L$ signal being connected to respective inputs of said first and second summing units, said $mT_S$ signal being connected to other respective inputs of said first and second summing units;
    said comparing element further including first and second comparators which are respectively connected to said first and second summing units, said first and second comparators having another respective input which is connected to said $(T_L - T_S)/2$ signal.

11. The reclosing apparatus of claim 10, wherein a first output associated with said first comparator is coupled to a respective input of said first summing unit, a second output associated with said second comparator being coupled to an input of said second summing unit;
    said reclosing apparatus further including a timing element which is effective for determining said time at which said circuit breaker shall be reclosed and including a switch for controlling the calculation of a reclosing time, said first and second outputs respectively associated with said first and second comparators being coupled to said timing element and to said switch.

12. The reclosing apparatus according to claim 11, in which each one of said first and second summing units has a respective positive and negative input and wherein said $nT_L$ signal is connected to said negative input of said first summing unit and to said positive input of said second summing unit, said $mT_S$ signal being connected to said positive input of said first summing unit and to said negative input of said second summing unit;
    said first and second comparators having a respective positive and negative input, said $(T_L - T_S)/2$ signal being coupled to said negative inputs of said first and second comparators, said positive input of said first comparator being connected to said output of said first summing unit and said positive input of said second comparator being connected to said output of said second summing unit.

13. A reclosing apparatus according to any one of claims 8, 9, 10, 11, or 12, including a further comparing element having an output which is coupled to said first adding unit and effective to disable same as soon as said signal $nT_L$ is greater than the value of a signal representative of $T_{mech} + T_S/4$ appears at the output of said first adding unit, where $T_{mech}$ is representative of the natural mechanical reaction period of said circuit breaker.

* * * * *